United States Patent [19]
Christy et al.

[11] Patent Number: 5,851,404
[45] Date of Patent: *Dec. 22, 1998

[54] PROCESS AND APPARATUS FOR LIQUID SLUDGE STABILIZATION

[75] Inventors: Richard W. Christy; Paul G. Christy, both of Wayne, Pa.

[73] Assignee: RDP Company, Norristown, Pa.

[*] Notice: The term of this patent shall not extend beyond the expiration date of Pat. No. 5,681,481.

[21] Appl. No.: 790,241

[22] Filed: Jan. 28, 1997

Related U.S. Application Data

[63] Continuation of Ser. No. 443,927, May 18, 1995, Pat. No. 5,681,481.

[51] Int. Cl.$^6$ .................................................. C02F 11/14
[52] U.S. Cl. ........................ 210/723; 210/738; 210/750; 210/751; 210/764; 210/758; 210/761
[58] Field of Search .................................. 210/723, 724, 210/738, 751, 758, 761, 764, 750

[56] References Cited

U.S. PATENT DOCUMENTS

| | | |
|---|---|---|
| 2,297,195 | 9/1942 | Behringer . |
| 2,723,954 | 11/1955 | Young .......................................... 210/2 |
| 3,793,841 | 2/1974 | Dozsa .......................................... 61/36 |
| 3,960,718 | 6/1976 | Lebo ............................................ 210/14 |
| 4,028,240 | 6/1977 | Manchak .................................... 210/59 |
| 4,043,909 | 8/1977 | Endo et al. ................................ 210/49 |
| 4,079,003 | 3/1978 | Manchak .................................... 210/46 |
| 4,190,372 | 2/1980 | Takagi et al. ............................ 366/141 |
| 4,270,279 | 6/1981 | Roediger ....................................... 34/9 |
| 4,295,972 | 10/1981 | Kamei ...................................... 210/710 |
| 4,306,978 | 12/1981 | Wurtz ....................................... 210/750 |
| 4,369,111 | 1/1983 | Roediger ................................. 210/199 |
| 4,378,886 | 4/1983 | Roediger ................................. 209/606 |
| 4,443,109 | 4/1984 | Watts ....................................... 366/134 |
| 4,460,470 | 7/1984 | Reimann ................................. 210/605 |
| 4,474,479 | 10/1984 | Redelman ............................... 366/300 |

(List continued on next page.)

FOREIGN PATENT DOCUMENTS

| | | |
|---|---|---|
| 1233588 | 1/1988 | Australia . |
| 835216 | 3/1955 | United Kingdom .......................... 34/2 |

OTHER PUBLICATIONS

Lime Stabilization (unkown origin).
Wallace & Tiernan, Paste–Type Lime Slacking Systems, Sep. 1989.
Getting, Wurtz & king, Carbon Dioxide addition to Alkaline Stabilized Biosolids.
EPA Process Design Manual For Sludge Treatment and Disposal, Sep. 1979.
Gettings, Wurtz and King, Carbon Dioxide Addition to Alkaline Stabilized Biosolids.
EPA Environment Regulations and Technology, Control of Pathogens and Vector Attractiveness in Sewage Sludge, EPA/625,R–92/013, Dec. 1992.
Christensen, Lime Stabilization of Wastewater Sludge–An Assessment, Mar. 1981.
Christensen & Westphal, Lime Stabilization: Effectiveness of Two Process Modifications, Jun. 1982.
Christy, Sr., Treatment Processes Sludge Disposal Using Lime.
Christy, Sr., Process Equipment Considerations for Lime Stabilization Systems Producing PSR and PFR Quality Sludge.

Primary Examiner—Neil McCarthy
Attorney, Agent, or Firm—Paul & Paul

[57] ABSTRACT

A process and apparatus for treatment of sludge is provided. The process includes providing sludge in a substantially liquid form and an alkaline additive to a preferably substantially closed reactor vessel, mixing the sludge and additive to ensure said pH is greater than about 12, maintaining the pH for a predetermined period of time, optionally applying supplemental heat to the sludge mixture in the reactor vessel to a predetermined elevated temperature for a predetermined period of time, maintaining the sludge mixture in a substantially fluid liquid condition, and discharging the sludge and additive mixture from the reactor vessel in a substantially liquid form such that it lends itself to be handled by gravity flow. The apparatus provides means to accomplish the above process.

21 Claims, 2 Drawing Sheets

U.S. PATENT DOCUMENTS

| | | | |
|---|---|---|---|
| 4,478,518 | 10/1984 | Tomyn | 366/156 |
| 4,514,307 | 4/1985 | Chestnut et al. | 210/751 |
| 4,541,986 | 9/1985 | Schwab, Kaschke et al. | 422/5 |
| 4,597,872 | 7/1986 | Anderson et al. | 210/605 |
| 4,614,587 | 9/1986 | Anderson et al. | 210/603 |
| 4,632,759 | 12/1986 | Anderson et al. | 210/603 |
| 4,659,471 | 4/1987 | Molin et al. | 210/603 |
| 4,659,472 | 4/1987 | Nordlund et al. | 210/609 |
| 4,710,032 | 12/1987 | Nordlund | 366/156 |
| 4,760,650 | 8/1988 | Theilander, et al. | 34/35 |
| 4,781,842 | 11/1988 | Nicholson | 210/751 |
| 4,789,477 | 12/1988 | Nordlund | 210/520 |
| 4,852,269 | 8/1989 | Glorioso | 34/11 |
| 4,902,431 | 2/1990 | Nicholson et al. | 210/751 |
| 4,981,600 | 1/1991 | Tobler et al. | 210/739 |
| 5,013,458 | 7/1991 | Christy, Sr. et al. | 210/751 |
| 5,083,506 | 1/1992 | Horn et al. | 99/348 |
| 5,186,840 | 2/1993 | Christy et al. | 210/709 |
| 5,229,011 | 7/1993 | Christy, Sr. et al. | 210/751 |
| 5,681,481 | 10/1997 | Christy et al. | 210/723 |

PROCESS AND APPARATUS FOR LIQUID SLUDGE STABILIZATION

This application is a continuation of application Ser. No. 08/443,927, filed May 18, 1995, now U.S. Pat. No. 5,681, 481.

BACKGROUND OF THE INVENTION

In the treatment of sewage sludge, or any biological sludge, it is desirable to reuse these sludges for soil amendment or fertilizing purposes. Sludge contains many nutrients which are beneficial for plant growth. It is necessary to stabilize the sludge by destroying pathogenic organisms prior to application of material to land. Without proper stabilization, diseases such as hepatitis, gastroenteritis, hook worms, or the like may result through either direct or indirect contact with sludges.

The principle pathogens of-concern in these sludges are bacteria, viruses, protozoa, and helminth worms. The addition of lime or alkaline material in order to raise the pH is effective in destroying bacteria, viruses and protozoa. However, helminth ova are more resistant and require additional treatment to be destroyed. Heating of sludges is effective in destroying helminth ova.

The combination of high pH and heat has been a known method of effectively reducing all pathogenic organisms to safe levels. This type of treatment has been used in the past to treat sludges which have been dewatered to at least 10% dry solids. The present invention provides a means of stabilizing liquid sludges containing less than 10% dry solids content. In the treatment of sewage, the solids are separated from the liquid stream by gravity settling. The sludge generally contains 0.2% to 30% solids concentration. Many treatments then add polymers or other flocculates to the sludge and dewater the sludge to bring the solids concentration up to a range of 10% to 60% dry solids, depending upon the type of sludge and types of dewatering equipment. U.S. Pat. No. 5,013,458, the complete disclosure of which is herein incorporated by reference, teaches a method of stabilizing the dewatered sludge.

The process of dewatering requires expensive capital equipment and expensive chemicals, manpower, and time to operate. Small communities with smaller waste flows do not generally generate enough sludge to justify the cost of dewatering.

These smaller facilities have not generally had a method of obtaining a low cost process which destroys the higher pathogenic organisms. Prior to this invention, these smaller plants typically relied on digestion or on simple lime addition for stabilization of sludge. These existing processes do not generally destroy the higher pathogenic organisms.

SUMMARY OF THE INVENTION

The present invention relates to a process and apparatus for liquid sludge stabilization such that the end product of the treatment can be spread by gravity flow. A preferred embodiment of the process comprises the steps of providing sludge having a solids content in a range in excess of 0% but less than 10% such that the sludge is a liquid at ambient temperature and pressure, and providing an alkaline additive, to a substantially closed reactor vessel. The additive is present in sufficient quantity to adjust the pH of the sludge mixture to a level greater than about 12. The preferred process further comprises mixing the sludge and additive into a sludge mixture, maintaining the pH level at a level greater than about 12 for a predetermined period of time, and applying supplemental heat to the sludge mixture in the reactor vessel to heat the mixture to a desired elevated temperature for the predetermined period of time. The process also includes maintaining the sludge mixture as a free-flowing liquid that is at least 90% liquid, and then finally discharging the sludge and additive mixture from the reactor vessel in a sufficiently liquid form such that it can be further handled by gravity flow.

DESCRIPTION

The apparatus and method of the present invention produce an end product that overcomes many of the problems associated with previous apparatus and processes. This invention produces a liquid product that is highly stabilized, such that the end product of the treatment can be spread by gravity flow, and that may provide water for irrigation and can be spread by a tanker truck. Additionally, the present invention produces a free-flowing end product that is easily spread on a uniform and controlled basis and can be transported in a sealed container to eliminate odorous discharges during transport.

The present invention treats sludge in liquid form at ambient temperature and pressure. The transfer and mixing of the material is based on the material flowing as a liquid. The amount of time necessary to obtain complete pasteurization is reduced as a result of the sludge being a liquid. The heat transfers quickly and evenly within the liquid. The particle size is smaller and, therefore, will heat consistently and less time is needed to penetrate through the center of the particle. For these reasons, the sludge temperature may be reduced and the amount of holding time can also be reduced.

In the present invention, the material, being a liquid, will flow by gravity and therefore, mixing is not required in order to move material through the process. Surface contact between particles is easily obtained with the liquid material. Mixing may consist of only flash mixing at the start of the process.

Also, in the present invention, preferably most of the heat required to elevate the sludge temperature is derived from the supplemental heat source. Thus, the present invention may utilize any of various caustic compounds such as either calcium oxide (CaO) (generates substantial heat when mixed with water), or calcium hydroxide ($CaOH_2$) (does not create substantial heat when mixed with water) as the alkaline source, because this invention does not need to derive its heat from the alkaline. Other caustic compounds that could be used include calcium carbonate, soda ash, sodium hydroxide or potassium hydroxide.

The present invention provides a process and apparatus for treatment of sludge. The process includes providing sludge in a substantially liquid form and an alkaline additive, preferably to a substantially closed reactor vessel, mixing the sludge and additive to ensure said pH is greater than about 12, maintaining the pH for a predetermined period of time, applying supplemental heat to the sludge mixture in the reactor vessel to a desired elevated temperature for the predetermined period of time, maintaining the sludge mixture in a fluid liquid condition, and discharging the sludge and additive mixture from the reactor vessel, preferably by gravity. The apparatus provides means to accomplish the above process.

This invention relates generally to a process and apparatus for liquid sludge stabilization.

Accordingly, it is a general object of the present invention to provide a new and improved process and apparatus for the stabilization of liquid sludge.

It is another object of the present invention to provide a new and improved process and apparatus for the stabilization of liquid sludge such that the federal regulations are complied with.

It is another object of the present invention to provide a new and improved process and apparatus for the stabilization of liquid sludge that comprises methods and means to destroy pathogens by maintaining sludge at a desired elevated temperature for a prescribed period of time.

Other objects and advantages of the present invention will become apparent from the following description taken in conjunction with the accompanying drawings.

DESCRIPTION OF THE PREFERRED EMBODIMENT

In the preferred embodiment, liquid sludge having a solids content above 0% and less than 10% and an alkaline material are placed in a reactor vessel. The materials are mixed and heated. Sufficient alkaline material is added in order to raise the pH to 12.0 or higher. Heat is applied to the vessel contents to raise the mixture to a predetermined temperature. This temperature should be at least 50° C. for at least approximately 12.0 hours, although higher temperatures for lesser periods of time may also suffice, to meet applicable federal regulations. The mixture maintains the temperature for a predetermined period of time, perhaps 6 hours, sufficient to reduce pathogenic organisms to safe levels. Any guideline mandated by the Environmental Protection Agency in 40 C.F.R. Part 503 would be applicable.

In the preferred embodiment, the mixing of the sludge and alkaline material at atmospheric conditions, leads to a hydration reaction:

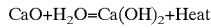

$$CaO + H_2O = Ca(OH)_2 + Heat$$

Using stoichiometric quantities in the reaction gives:

56 lbs. of CaO+18 lbs. $H_2O$=74 lbs. of $Ca(OH)_2$ as well as releasing 27,500 BTUs per pound mole.

The alkaline material may be any of a number of caustic compounds including lime (defined here as substantially pure calcium oxide) or other substances consisting of or containing calcium oxide or calcium carbonate, such as quicklime, dolomitic lime, or lime kiln dust or cement kiln dust. Therefore, the additive is selected from the group consisting of calcium oxide, calcium hydroxide, calcium carbonate, soda ash, sodium hydroxide and potassium hydroxide. The selection may be dependent on availability and pH level desired, because some members of the group may not be effective to raise the pH to the desired predetermined level. For example, if the desired predetermined pH level is twelve, dolomitic lime may not be volatile enough to raise the mixture to that level.

In the preferred embodiment, the mixing is accomplished using injected air at sufficient velocities to prevent settling of solids during the pasteurization step. However, mixing may be accomplished by any known mixing means in the art. The air also helps to strip or remove ammonia gas which is released as a result of the high pH. The ammonia gas can then be vented to atmosphere through an ammonia scrubber or recirculated internally. The vessel contains heat elements which are used to bring up the temperature of the material contained within the tank.

Figure 1:
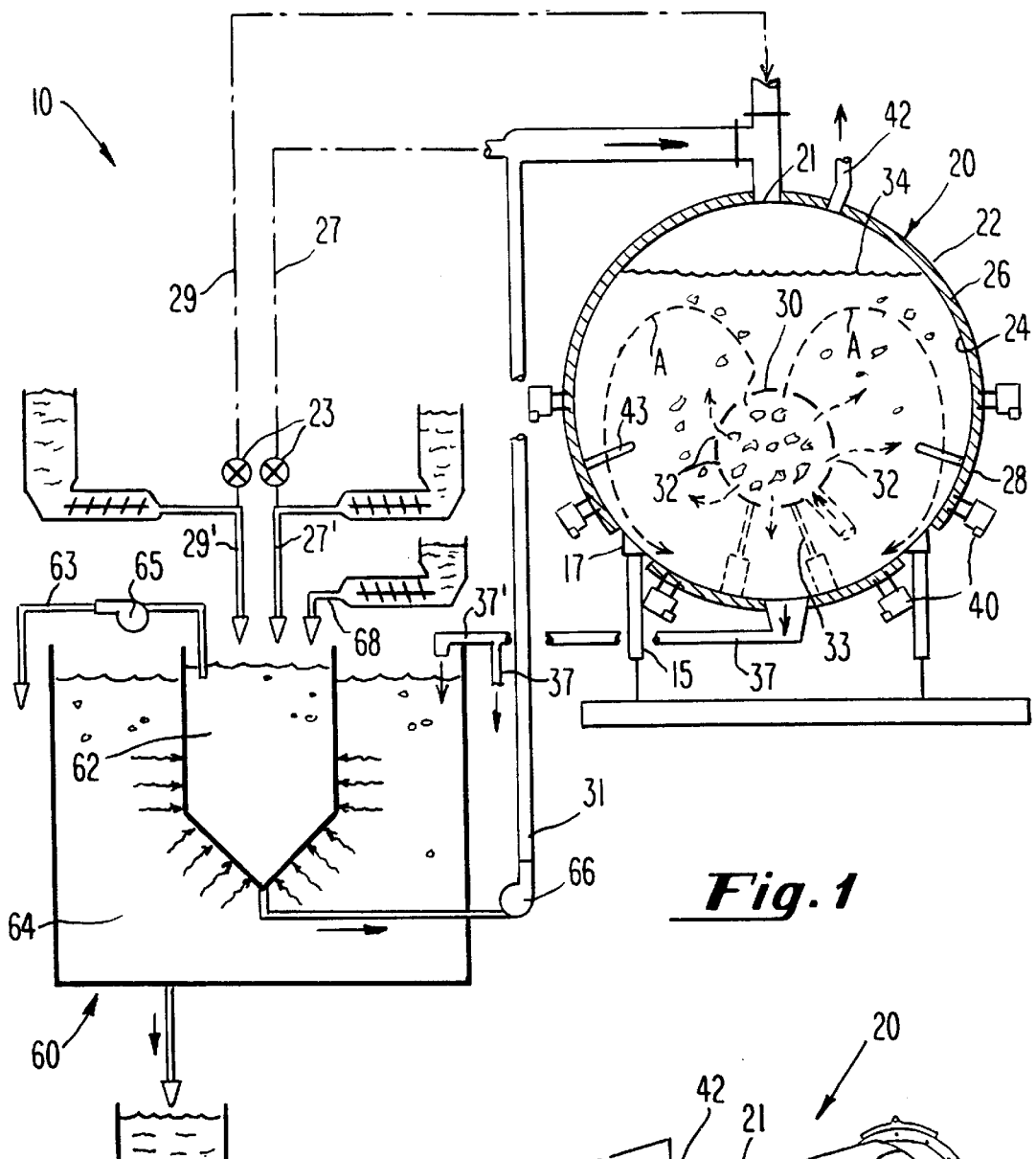
FIG. 1 is a schematic view of a liquid sludge stabilization apparatus/system and in accordance with a preferred embodiment of the present invention.

Referring now in detail to the drawings, wherein like reference numerals indicate like elements throughout the several views, there is shown in FIG. 1 a schematic of an apparatus for the liquid sludge stabilization process 10 in accordance with one preferred embodiment of the present invention. The illustrative apparatus is shown generally comprising a reactor vessel 20, an air supply 25 (see FIG. 2), and an optional preheat chamber 60, together with associated piping, pumps, and valves.

Figure 2:
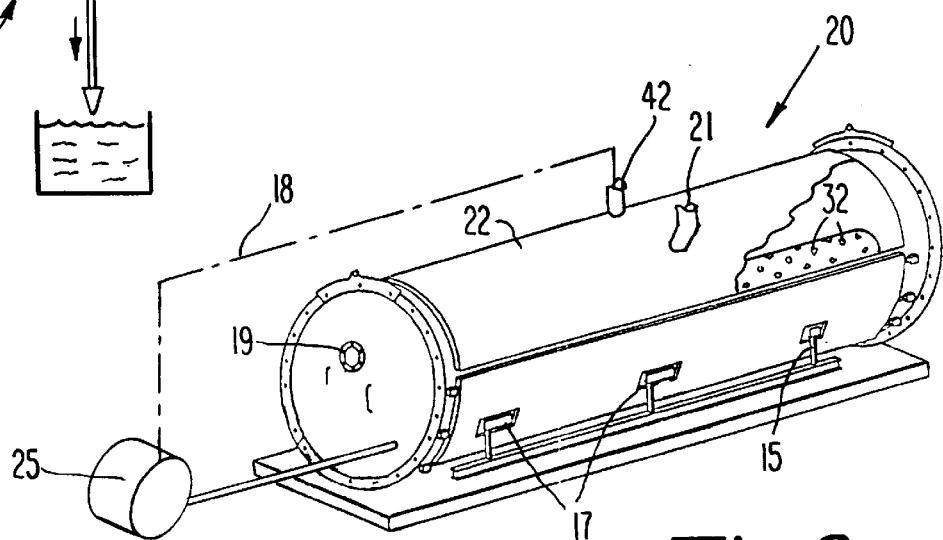
FIG. 2 is a perspective view of a reactor vessel as employed in the apparatus of FIG. 1.

As can be seen in FIGS. 1 and 2, the reactor vessel 20 comprises a hollow vessel 22 to hold a sludge—alkaline mixture. The reactor vessel 20 contains an inner shell 24 which is surrounded by insulation 26. The insulation 26 may be further covered with a jacket 28 to prevent the deterioration of the insulation 26. At the top of the reactor vessel 20 is an inlet 21 for sludge and alkaline material to enter. In the non-preheat mode of the invention, the sludge and alkaline material may be provided to the apparatus 10 through conduits 27 and 29 respectively, shown in phantom in FIG. 1. The desired ratio of sludge to alkaline material is provided by a control means, which, in the embodiment of FIG. 1 are shown as metering valves 23.

In the preferred embodiment, the stabilization of the sludge of the present invention is done as a batch process. Sludge and alkaline material are provided to the substantially empty reactor vessel 20. The contents are then mixed and heated to the desired temperature for the required duration. Mixing may be accomplished by a mixing means, such as header 30 described below, which may be utilized either only at some portion of the cycle, for example, the beginning, or continuously throughout the cycle, so long as sufficient mixing is obtained at the outset of the stabilization process. The stabilized sludge—alkaline mixture is then preferably removed from the reactor vessel by gravity flow through conduit 37 shown at its lower end and a new batch may then be provided to the reactor vessel 20. The stabilized sludge—alkaline mixture exiting the reactor vessel 20 may be stored and/or used for land application, as desired.

As can be seen in cross-section in FIG. 1, in the preferred embodiment, a generally sieve-like header 30, for example, the sparger type, containing openings or orifices 32 extends inside the reactor vessel 20 for the length of the reactor vessel 20. Subsequent to filling the reactor vessel 20 with sludge and alkaline to a level 34 above the level of the header 30, air is passed through the header 30 and out the orifices 32 forming bubbles within the liquid. The bubbles cause the liquid to rise well above the header 30. The motion induced by the bubbles is controlled to provide proper mixing and agitation.

One or more adjustable supports 33 for the header 30 may be provided such that the height of the header 30 can be optimized for thorough mixing with different levels of sludge—alkaline mixture, as well as different solids content of sludge. The header 30 is designed and located such that an induced rolling action, as simulated by direction arrows A in FIG. 1, maintains uniform temperature and pH.

In the preferred embodiment, heating elements 40 are attached to (inside or outside), or embedded in the walls of, the reactor vessel 20 such that conduction heating of the sludge 34 in the reactor vessel 20 to a desired temperature is accomplished. The temperature of the heating elements 40 is adjusted in order to heat and then maintain the temperature of the reactor vessel 20 contents.

One or more openings 42 to exhaust air may optionally be provided. The exhaust air can be vented in several ways and may be also provided with exhaust fan (not shown) or other means for operating the vessel under a partial vacuum or at a relative pressure below ambient to remove gases, such as organic or other compounds from the liquid. The air can be exhausted directly to atmosphere, or optionally, after passing through a scrubber designed to remove any offensive odors (not shown) such as ammonia gas. Optionally, the exhaust air can also be returned to the air supply 25 and recycled through the header 30 through return conduits 18 shown in phantom in FIG. 2. In each case, the reactor vessel 20 and air supply 25 is designed to operate at or above atmospheric pressure. Increasing the air pressure to operate above ambient pressure will inhibit the formation of foam or froth within the reactor vessel 20.

Additionally, one or more temperature probes 43 measure the temperature of the sludge mixture in order to control the heat and pathogen destruction process. Supports 15 for the reactor vessel 20 may be provided with thermal expansion means 17 to relieve stresses due to thermal expansion. Finally, a sight glass 19 may be provided in the reactor vessel 20, located approximately at the height of the desired level of liquid in the vessel, to check the proper fill level of the vessel, as well as for visual inspection to ensure the mixing is properly occurring.

FIG. 1 additionally shows an optional modification that may be made to the preferred embodiment. As shown in FIG. 1, rather than supplying sludge and lime directly to the reactor vessel 20 through conduits 27 and 29, the sludge and alkaline material may be first provided to preheat chamber 60 through conduits 27' and 29', depending upon the settings of valves 23. Preheat chamber 60 provides a means to exchange heat from the heated and pasteurized mixture that has completed the stabilization process in reactor vessel 20 after the heated mixture leaves vessel 20.

As can be seen in FIG. 1, the preheat chamber 60 provides an inner chamber 62 preferably capable of holding approximately the same quantity of sludge—alkaline mixture that is to be treated in the reactor vessel 20. Provision is made for the addition of other chemicals such as iron salts and oxygen through orifice 68 to facilitate the coagulation of the solids. After coagulation and settling of the solids, clear liquid can be decanted from the inner chamber 62 through decanting conduit 63 by decant pump 65 providing increased solids concentration and reduced volume of sludge to be heated, if desired.

As can be seen in FIG. 1, outer chamber 64 substantially surrounds inner chamber 62, providing a means to transfer heat from the heated, stabilized sludge that has exited the reactor vessel 20 via line 37' to the incoming unstabilized sludge that is provided to inner chamber 62. By increasing the incoming sludge temperature through this heat exchange process, less energy is required to raise the sludge temperature. Additionally, the heat exchange process will help cool the stabilized sludge that has exited the reactor vessel 20 prior to storage or land application. Moreover, inner chamber 62 will also provide a receptacle to hold the sludge such that a second pH measurement may be made, if desired.

Upon heating of the sludge mixture in inner chamber 62, the sludge mixture is either pumped by pump 66, or gravity fed (not shown), into the reactor vessel 20 via conduit 31. Additional heat is then applied to the reactor vessel 29 by means of heating elements 40 to bring the mixture to the pre-determined temperature. This temperature is maintained for the required period of time. At the completion of this time, the sludge mixture flows from the reactor vessel 20 to the outer chamber 64 of the preheat chamber 60 to preheat a new volume of sludge mixture in inner chamber 62.

Figure 3:
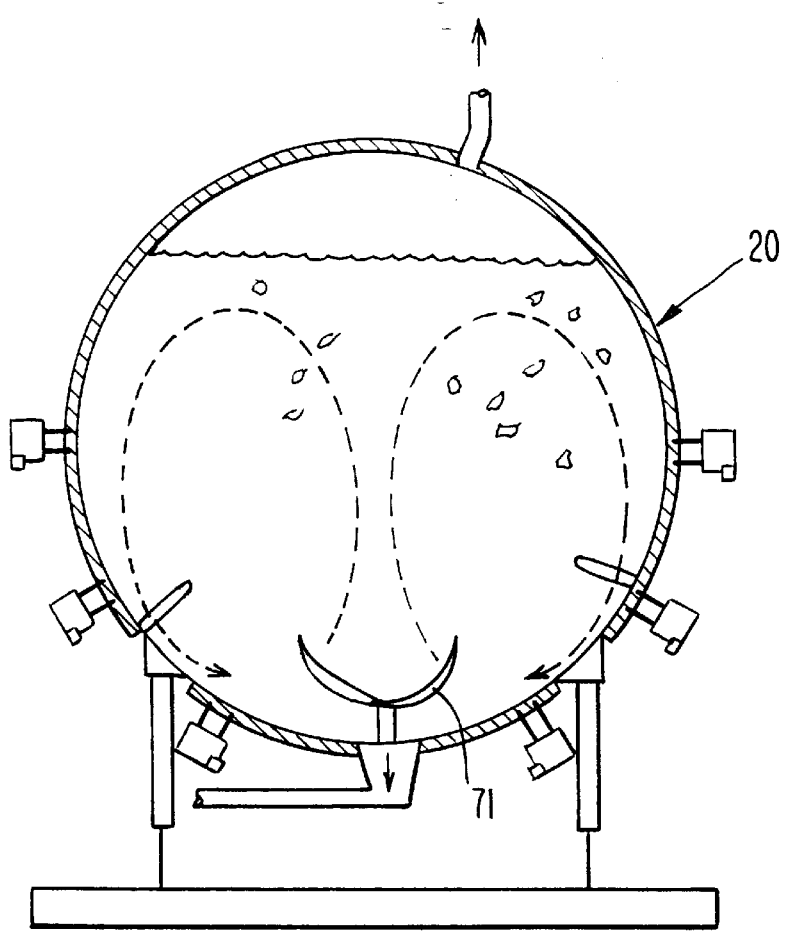
FIG. 3 is a side, transverse, sectional view of a reactor vessel of a type preferably employed in the apparatus of FIG. 1, indicating optional shearing means.

The present invention is based on keeping the sludge in a liquid form, such that the material will behave and flow as a liquid. As sludge approaches solids concentrations in excess of 3% and moves above 10%, the sludge becomes more viscous and will not flow as easily. As the solids content of the sludge reaches above 10%, there can be problems in handling the sludge without impelling it in some manner. For example, thicker sludge (10% or more) will not easily flow by gravity from a tanker truck, often resulting in difficulty in unloading the material from the truck. The thicker viscosity sludge also does not work very well with conventional liquid manure spreaders used extensively by the agricultural community. As shown in FIG. 3, the present invention may optionally be equipped with a shearing type mixer, which utilizes, for example, blender blades 71, auger blades (not shown), or the like. The added shearing step will cause a change in the viscosity of the sludge allowing the material to flow more readily. Shearing will allow the process to work on thicker sludges and reduce the amount of energy necessary to stabilize the sludge solids. For example, to stabilize 1,000 pounds of sludge solids per day at a 1% concentration without shearing, will require approximately a 111 kW heat system. However, at a 5% concentration, the same 1,000 pounds of sludge can be stabilized with only a 20 kW heat system if shearing is used to mix the sludge. However, a 5% slurry may require additional shearing, beyond that which occurs in the vessel 20 in the mixing operation, in order to be processed using conventional equipment. This shearing step may occur prior to, during, or after the stabilization step.

Figure 4:
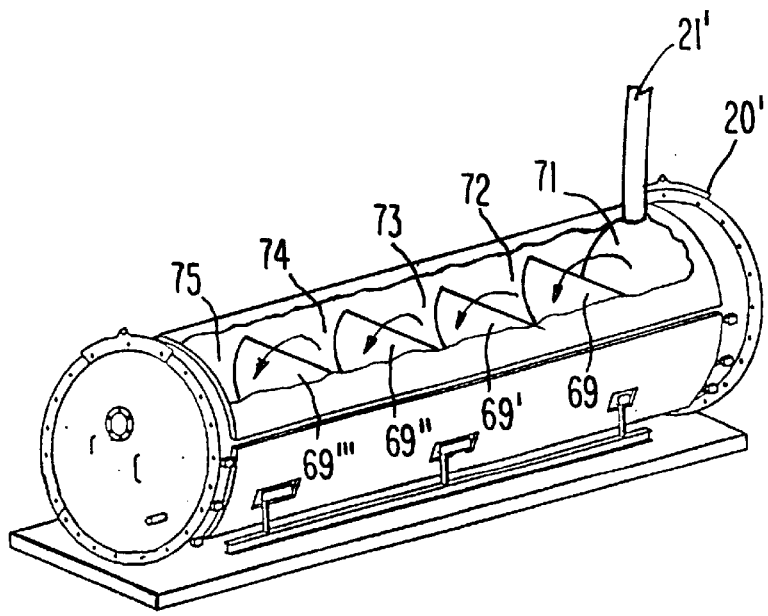
FIG. 4 is a simplified, partially cutaway, perspective view of an alternate embodiment of a reactor vessel as employed in the apparatus of FIG. 1, as utilized in a continuous process.

In an alternate embodiment, the mixing process in the vessel 20 of the present invention can be accomplished continuously. As can be seen in the cutaway view of FIG. 4, the reactor vessel 20' of this alternate embodiment contains a series of compartments separated by a series of progressively reduced height vertical separations 69, 69', 69", 69"', for example, the five compartments 71–75 shown in FIG. 4. These compartments provide means to ensure that each particle of sludge remains within the reactor vessel 20' for the desired period of time. In this alternate embodiment, sludge is continuously metered through inlet 21' at one end of the reactor vessel 20' into the first compartment 71. At the same metered rate, after all compartments 71–75 are filled, sludge flows from the first compartment 71 to the second compartment 72 and so on through to the last compartment 75, then finally is discharged from the vessel 20' at the opposite end, below compartment 75 (not shown). Mixing occurs continuously such that no particles travel straight through the entire reactor vessel 20'.

Continuous mixing and heating of the sludge—additive can also be effected by delivering the sludge additive, at ambient pressure or elevated pressure, through a boiler tube type of heat exchanger comprised of one or more continuous, straight or sinuous tubes, with or without bubbling of air therethrough, or other turbulence causing mixers of various means.

Likewise, the preheating of the sludge—additive mixture can be effected via a boiler tube type heat exchanger in lieu of the chamber 64, shown in the drawings.

Environmental Protection Agency regulations require municipalities to certify, under penalty of law, that the treated sludge complies with all regulations. The sludge treatment process of the current invention preferably used facilitates compliance with the certifications required under 40 C.F.R. Part 503.

The present process and apparatus provide for a liquid "A" Process that produces a Class A end product through a combination of heat and lime stabilization. Typically, the process will require up to six hours to reach the Environmental Protection Agency mandated pasteurization temperature. The sludge is held for a predetermined time as detailed in 40 C.F.R., Part 503. After this is accomplished, the sludge—alkaline mixture qualifies as a class A biosolid without further processing.

The above description and the figures depicted are for purposes of illustration only and are not intended to be, and should not be construed as limitations on the invention.

Moreover, certain modifications or alternatives may suggest themselves to those skilled in the art upon reading of this specification, all of which are intended to be within the spirit and scope of the present invention as defined in the appended claims.

We claim:

1. A process for treatment of sludge such that the end product of the treatment can be spread by gravity flow comprising:
   (a) providing sludge having a solids content in a range in excess of 0% but less than 10% such that the sludge is a liquid at ambient temperature and pressure, and providing an additive, to a substantially closed reactor vessel, said additive being a caustic compound selected from the group consisting of calcium hydroxide, calcium oxide, calcium carbonate, soda ash, sodium hydroxide and potassium hydroxide, with said additive present in sufficient quantity to adjust the pH of the sludge mixture to a level greater than about 12;
   (b) mixing the sludge and additive into a sludge mixture to ensure said pH is greater than about 12;
   (c) maintaining the pH level at a level greater than about 12 for a predetermined period of time;
   (d) controlling the pressure in the reactor vessel relative to the ambient pressure, to facilitate control of the reaction;
   (e) maintaining the sludge mixture as a free-flowing liquid that is at least 90% liquid; and
   (f) discharging the sludge and additive mixture from the reactor vessel in a sufficiently liquid form such that it can be further handled by gravity flow.

2. The process of claim 1, including the step of applying supplemental heat to the sludge mixture in the reactor vessel to heat the mixture to a desired elevated temperature for a predetermined period of time.

3. The process of claim 1, wherein the step of controlling the pressure includes maintaining a pressure in the reactor vessel above atmospheric pressure, to inhibit the amount of foam or froth formed in the vessel.

4. The process of claim 1, wherein the step of controlling the pressure includes maintaining a pressure in the reactor vessel, below atmospheric pressure to remove gases from the mixture.

5. The process of claim 1, including the step of combining iron salts and oxygen with the additive to pre-thicken the sludge in amounts that maintain the sludge in a free-flowing liquid state.

6. The process of claim 1, including the step of preheating at least some of the sludge in a preheat chamber prior the step of mixing the sludge and additive by using heat from newly stabilized sludge mixture discharged from the reactor vessel at an elevated temperature relative to ambient temperature as a heat source for the preheat chamber.

7. The process of claim 6, wherein the step of using heat from newly stabilized sludge as a heat source for the preheat chamber includes delivering sludge mixture from the reactor vessel to a zone of liquid conductive contact with the preheat chamber.

8. The process of any one of claims 1–7, wherein the step of maintaining the sludge mixture as a free-flowing liquid includes shearing the mixture using a shearing means to change the viscosity of the sludge mixture, allowing the material to flow more readily.

9. The process of any one of claims 1–7, wherein the step of mixing the sludge and additive includes delivering air through the sludge and additive mixture while it is in the reactor vessel.

10. The process of claim 1, wherein the steps occur on a continuous basis.

11. The process of claim 6, wherein both the sludge and additive are preheated in the preheat chamber.

12. The process of any one of claims 1–7, wherein the step of mixing the sludge and additive mixture includes shearing the mixture using a shearing blade means.

13. The process of claim 2, wherein the step of applying supplemental heat includes delivering heat to the reactor vessel walls for transmission of heat to the vessel interior.

14. A process for treatment of sludge such that the end product of the treatment can be spread by gravity flow comprising:
   (a) providing sludge having a solids content in a range in excess of 0% but less than 10% such that the sludge is a liquid at ambient temperature and pressure, and providing an additive, to a substantially closed reactor vessel, said additive being a caustic compound selected from the group consisting of calcium hydroxide, calcium oxide, calcium carbonate, soda ash, sodium hydroxide and potassium hydroxide, with said additive present in sufficient quantity to adjust the pH of the sludge mixture to a level greater than about 12;
   (b) mixing the sludge and additive into a sludge mixture to ensure said pH is greater than about 12;
   (c) maintaining the pH level at a level greater than about 12 for a predetermined period of time;
   (d) maintaining the sludge mixture as a free-flowing liquid that is at least 90% liquid; and
   (e) discharging the sludge and additive mixture from the reactor vessel in a sufficiently liquid form such that it can be further handled by gravity flow.

15. The process of claim 14, including the step of applying supplemental heat to the sludge mixture in the reactor vessel to heat the mixture to a desired elevated temperature for a predetermined period of time.

16. The process of claim 14, including the step of combining iron salts and oxygen with the additive to pre-thicken the sludge in amounts that maintain the sludge in a free-flowing liquid state.

17. The process of any one of claims 14–16, wherein the step of maintaining the sludge mixture as a free-flowing liquid includes shearing the mixture using a shearing means to change the viscosity of the sludge mixture, allowing the material to flow more readily.

18. The process of any one of claims 14–16, wherein the step of mixing the sludge and additive includes delivering air through the sludge and additive mixture while it is in the reactor vessel.

19. The process of claim 14, wherein the steps occur on a continuous basis.

20. The process of any one of claims 14–16, wherein the step of mixing the sludge and additive mixture includes shearing the mixture using a shearing blade means.

21. The process of claim 15, wherein the step of applying supplemental heat includes delivering heat to the reactor vessel walls for transmission of heat to the vessel interior.

* * * * *

UNITED STATES PATENT AND TRADEMARK OFFICE
CERTIFICATE OF CORRECTION

PATENT NO. : 5,851,404

DATED : December 22, 1998

INVENTOR(S) : Christy et al

It is certified that error appears in the above-identified patent and that said Letters Patent is hereby corrected as shown below:

Column 1, line 33, 30% should be 3%.;
Column 6, line 21, "As shown in Fig. 3,...." should start a new paragraph;

Signed and Sealed this

Eighteenth Day of May, 1999

Attest:

Q. TODD DICKINSON

*Attesting Officer*     Acting Commissioner of Patents and Trademarks